(12) United States Patent
Nayar

(10) Patent No.: US 12,544,464 B2
(45) Date of Patent: Feb. 10, 2026

(54) HOT HUMID WINDY OVEN DEVICE AND METHOD FOR DECONTAMINATION, DISINFECTION, AND STERILIZATION

(71) Applicant: TAT Technologies LLC, St. Mary's, PA (US)

(72) Inventor: Harbhajan S. Nayar, New Providence, NJ (US)

(73) Assignee: TAT Technologies LLC, Saint Marys, PA (US)

( * ) Notice: Subject to any disclaimer, the term of this patent is extended or adjusted under 35 U.S.C. 154(b) by 38 days.

(21) Appl. No.: 17/242,470

(22) Filed: Apr. 28, 2021

(65) Prior Publication Data
US 2021/0330826 A1 Oct. 28, 2021

Related U.S. Application Data

(60) Provisional application No. 63/016,463, filed on Apr. 28, 2020.

(51) Int. Cl.
*A61L 2/06* (2006.01)
*A61L 2/20* (2006.01)
*A61L 2/208* (2026.01)

(52) U.S. Cl.
CPC .............. *A61L 2/06* (2013.01); *A61L 2/208* (2013.01); *A61L 2202/122* (2013.01); *A61L 2202/15* (2013.01); *A61L 2209/134* (2013.01); *A61L 2209/135* (2013.01)

(58) Field of Classification Search
CPC ...... A61L 2/06; A61L 2/208; A61L 2202/122; A61L 2202/15; A61L 2209/134; A61L 2209/135
See application file for complete search history.

(56) References Cited

U.S. PATENT DOCUMENTS

| | | | | |
|---|---|---|---|---|
| 6,010,400 A | * | 1/2000 | Krainiak | A61L 9/16 454/187 |
| 6,339,678 B1 | * | 1/2002 | Sorensen | F22B 1/287 392/386 |
| 2005/0084415 A1 | * | 4/2005 | McVey | B67C 7/0073 422/298 |
| 2011/0072759 A1 | * | 3/2011 | Mielnik | A61L 2/208 53/167 |

(Continued)

OTHER PUBLICATIONS

Reynolds Number, Engineering ToolBox (Year: 2017).*

*Primary Examiner* — Brendan A Hensel
(74) *Attorney, Agent, or Firm* — Jonathan D'Silva; Benjamin Clarke; Penn State Dickinson Law IP Clinic

(57) ABSTRACT

Aspects disclosed herein include a device and a method for disinfecting, sterilizing, or decontaminating daily used equipment and materials within a relevant field. The device may be compact, flexible, economical, and operator friendly. The device and method may be used in hospitals, warzones, or dentist's offices to disinfect, sterilize, or decontaminate low heat resistant materials, medium heat resistant materials, and high heat resistant materials. By using a compressed gas to deliver heat, humidity, and concentrations of H2O2, and using a plurality of pre-determined openings within a plurality of communicatively connected plenums of the device, there is no need for moving parts or circulation devices.

18 Claims, 3 Drawing Sheets

(56) References Cited

U.S. PATENT DOCUMENTS

| | | | |
|---|---|---|---|
| 2012/0219456 A1* | 8/2012 | Childers | A61L 2/208 |
| | | | 422/547 |
| 2018/0353633 A1* | 12/2018 | Laflamme | A61L 2/24 |
| 2019/0255202 A1* | 8/2019 | Smith | A61L 2/06 |
| 2022/0378961 A1* | 12/2022 | Golkowski | A61L 2/22 |

* cited by examiner

HOT HUMID WINDY OVEN DEVICE AND METHOD FOR DECONTAMINATION, DISINFECTION, AND STERILIZATION

CROSS-REFERENCE

This application claims the benefit of U.S. Provisional Application No. 63/016,463, filed Apr. 28, 2020, which application is incorporated herein by reference.

BACKGROUND OF THE INVENTION

Doctors, nurses, general health care providers, and various medical practices require the use of personal protective equipment ("PPE") and medical or surgical instruments. During use, these PPE and instruments are contaminated by bacteria, fungi, and viruses like COVID-19, influenza, and other human pathogens or microorganisms. As a result of contamination, PPE and medical or surgical instruments are routinely disposed of after use. N95 masks, as an example, have always been thrown away after each limited use. Similarly, hospitals commonly throw away plastics, like syringes and surgical instruments. Routine disposal adds a significant cost to the care of patients. Alternatively, PPE and medical or surgical instruments may be decontaminated, disinfected, or sterilized for re-use. The PPE and medical or surgical instruments are made from different materials like low heat resistant polymers (e.g., N95), medium heat resistant plastics (e.g., syringes), or high heat resistant metals (e.g., stainless steel surgical instruments).

In the medical industry, there exists a wide range of decontamination, disinfection, and sterilization approaches including: Hydrogen Peroxide (H2O2) Vapor Decontamination; UV Light Sanitization; Plasma Sterilization; Superheated Steam Sterilization; and Thermal Sterilization. Each of these approaches has various drawbacks and costs required by different tools to treat different types of equipment.

Low temperature antimicrobial vapor hydrogen peroxide (VHP) is used to decontaminate enclosed and sealed areas such as laboratory workstations, isolation, passthrough rooms, and aircraft interiors. VHP is produced from a solution of liquid H2O2 (30-35% concentration) at 120° C. to give a mixture of VHP and water vapor. As a "dry" process, a concentration of VHP is maintained below a given condensation point, which depends on an area temperature. A generator initially dehumidifies the ambient air, then produces VHP by passing aqueous H2O2 over a vaporizer and circulating the vapor at a concentration in the air, typically 140 ppm to 1400 ppm, depending upon the infectious agent to be cleared. By comparison, 75 ppm is considered "immediately dangerous" to the life and health of humans. VHP is brought into a sterilization chamber by a carrier gas such as air using either a light negative pressure (vacuum) or a slight positive pressure.

After the VHP has circulated in an enclosed space for a pre-defined period of time, the VHP is then circulated back through the generator, where it is broken down into water and O2 by a catalytic converter, until the concentration of VHP falls to a safe level of 1 ppm. Alternatively, the VHP can be vented to the ambient air when recapturing the VHP is not needed. Monitoring of the VHP concentration in the air is normally done via electrochemical sensors. VHP is limited by a lower penetration capability into fiber-like materials and a long cycle time.

Superheated Steam Sterilization, or Autoclave Sterilization, is carried out at a temperature of 350° F. and a pressure of 15 psi in an autoclave. The Superheated Steam Sterilization process is normally used for sterilization of large volumes of heat resistant materials. However, the Superheated Steam Sterilization process requires a steam generator and a vacuum pump to purge the air with steam several times before beginning a new cycle, which increases the cost of each cycle. The Superheated Steam Sterilization process requires lower temperatures than Dry Heat Decontamination.

Dry Heat Decontamination or Thermal Sterilization uses either a static air or a forced air. The proper times and temperatures for Dry Heat Decontamination of a stainless steel or a glass-like material are 300° F. for 150 minutes, 320° F. for 60 minutes, 340° F. for 30 minutes, or 375° F. for 10 minutes. The decontamination temperature for a stainless steel or a glass-like material can be reduced significantly by exposing them for longer times. However, these temperatures are too high to decontaminate a non-woven polypropylene material like N95. Polypropylene melts at 327° F., and polypropylene is recommended to a maximum operating temperature is 180° F.

A Thermal Death Point (TDP) for most of these harmful organisms is between 120° F. and 190° F. with an exposure time between a few minutes and a few hours—most TDP's are typically between 10 and 60 minutes depending on the organism and the Thermal Death Time (TDT) to get an acceptable decontamination level. For example, the minimum temperature needed to kill COVID-19 in 15 minutes is 133° F.

SUMMARY OF THE INVENTION

An operator in a relevant field may require a plurality of different devices to disinfect, sterilize, or decontaminate the daily-used equipment within the relevant field. Non-limiting embodiments of an easy to use, compact, flexible, economical and operator friendly device and non-limiting embodiments of a method for disinfecting, sterilizing, and decontamination of the daily-used equipment are disclosed below.

In some non-limiting embodiments disclosed herein are devices used for disinfecting, sterilizing, and decontaminating PPE, medical and surgical instruments, and other objects. In one aspect, the device may be used in hospitals, warzones, or a dentist's office to disinfect, sterilize, or decontaminate a low heat resistant PPE, a medium heat resistant surgical instruments, and a high heat resistant surgical instrument.

In another aspect, the device substantially improves upon the Dry Heat Decontamination technology by removing the need for a heating ability within an inner chamber via a pre-heating device located externally of the inner chamber.

In another aspect, the device replaces the need for moving parts with the use of a compressed gas, like air. The compressed gas is used to carry a decontamination ingredient to the decontamination chamber. Each of the decontamination ingredients, such as, but not limited to heat, hydrogen peroxide vapor, and water vapor, may be combined in a plurality of communicatively connected plenums before entering the inner chamber.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Aspects disclosed herein describe a device for decontaminating, disinfecting, and sterilizing an object. In some non-limiting embodiments, the device may comprise a plurality of the following sub-assemblies: a compressed air control panel; an air bubbler sealed tank; an air heater; a special small piece of equipment like a dish; and a Hot Humid Windy Batch Oven (HHW). In some non-limiting embodiments, the device may comprise a batch oven; a pre-heating device, a duct; and a gas delivery system. In some non-limiting embodiments, the device may be installed on a tabletop.

In one embodiment, the carrier gas control panel may have a filter, a pressure regulator, a pressure gauge, and a compressed gas flowmeter. An example of a compressed gas that is readily available may be compressed air. The compressed gas may be supplied from an air compressor or semi-high pressure air blower. In one embodiment, the sealed air bubbler tank may contain water at a fixed level. The sealed air bubbler may be used to humidify the compressed gas. The compressed gas may be pushed through a water column at a pre-determined temperature before the compressed gas enters the air heater. The compressed gas may be humidified to a dew point of up to about +120° F. The sealed air bubbler tank may also have a bypass valve allowing the compressed gas to pass through the water column without being humidified by the sealed air bubbler. The sealed air bubbler tank may be mounted on a wall or a table.

Figure 2:
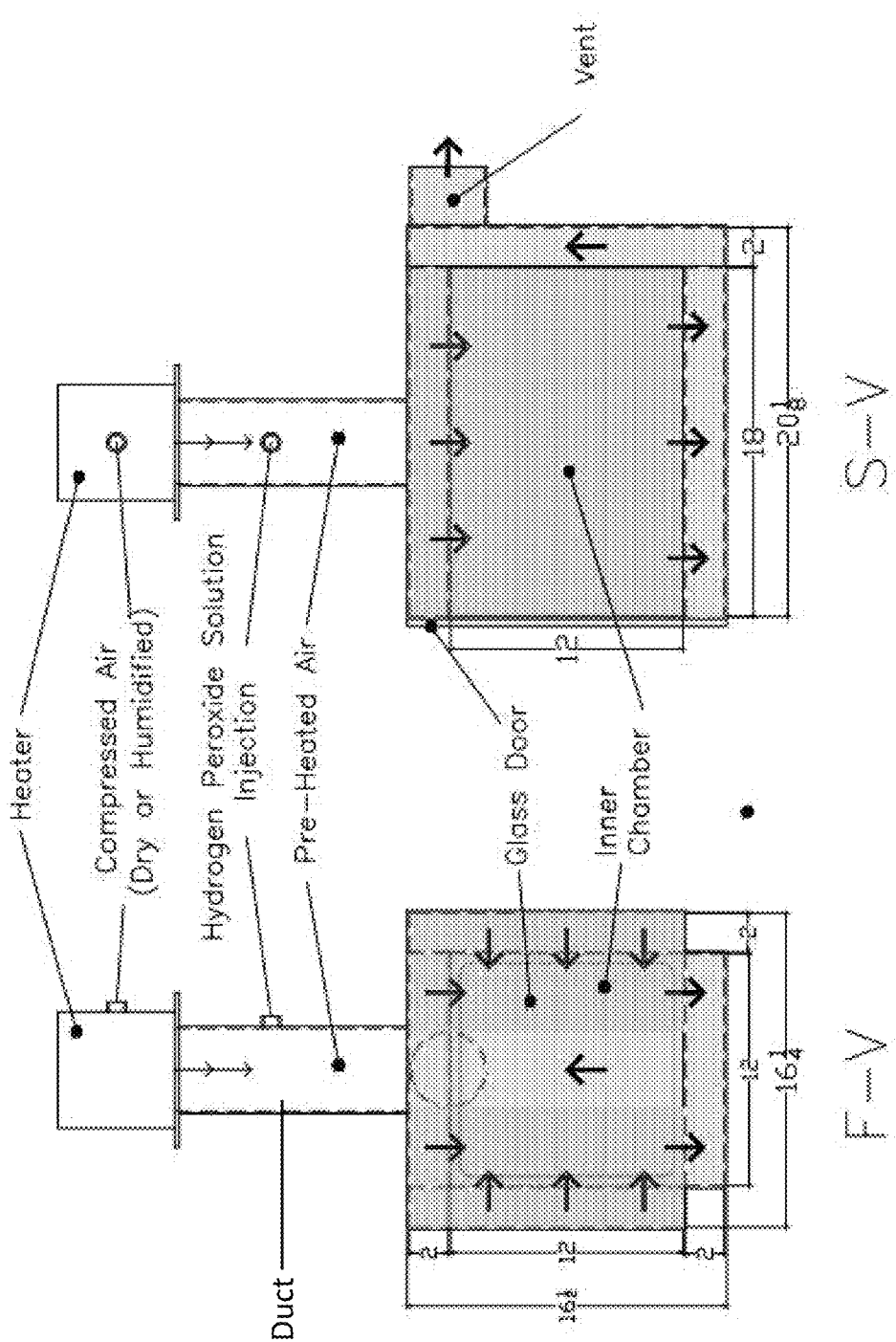
FIG. 2 illustrates an embodiment of the device from a front view, and a side view.

In one embodiment, the air heater can heat up a flow of the compressed gas up to 700° F. very quickly. FIG. 2 depicts some non-limiting embodiments of the air heater located above the HHW.

In one embodiment, the special small piece of equipment like a dish may be integrated in a region between the air heater and a top side of the HHW. In one aspect, the region between the air heater and the top side of the HHW may be called a duct. The dish may be used to hold a hydrogen peroxide liquid solution of up to 30% concentration and optionally an additional liquid like water. The liquid within the dish may be vaporized into the compressed gas, after the compressed gas is heated and passes over the dish containing the liquid. The hydrogen peroxide liquid solution or water may be introduced through an injection point, depicted in FIG. 1b located on the duct. The special small piece of equipment may be located within the duct. The vaporized hydrogen peroxide and water vapor may mix with the pre-heated compressed gas in the duct.

Figure 3:
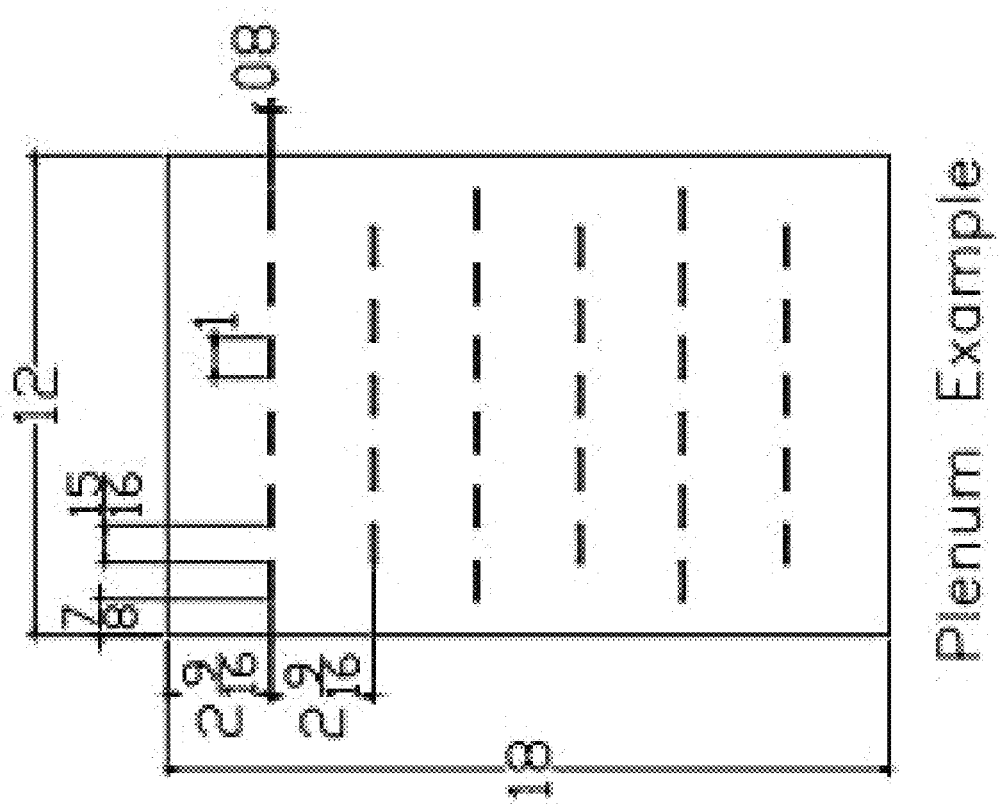
FIG. 3 illustrates an embodiment of a plenum of the device.

In one embodiment, the HHW may be where the decontamination, disinfection, or sterilization of an object occurs under pre-determined and controlled conditions. In one embodiment, a dimension of the HHW exterior may be 18"×18"×24". In one embodiment, the HHW may have a rectangular inner chamber. The shape of the inner chamber may accommodate an object, like PPE and other medical instruments. A dimension of the inner chamber may be 12"×12"×18". The inner chamber of the HHW may reach a temperature of up to 700° F. An external surface of the HHW may reach a temperature of only 100° F. In some non-limiting embodiments, a material of the HHW may be stainless steel. Between the exterior dimensions and the inner chamber dimensions, there may be a thermal insulation material and the plurality of plenums. FIG. 3 illustrates an embodiment of a plenum including a dimension of the interior of the plenum.

Figure 1:
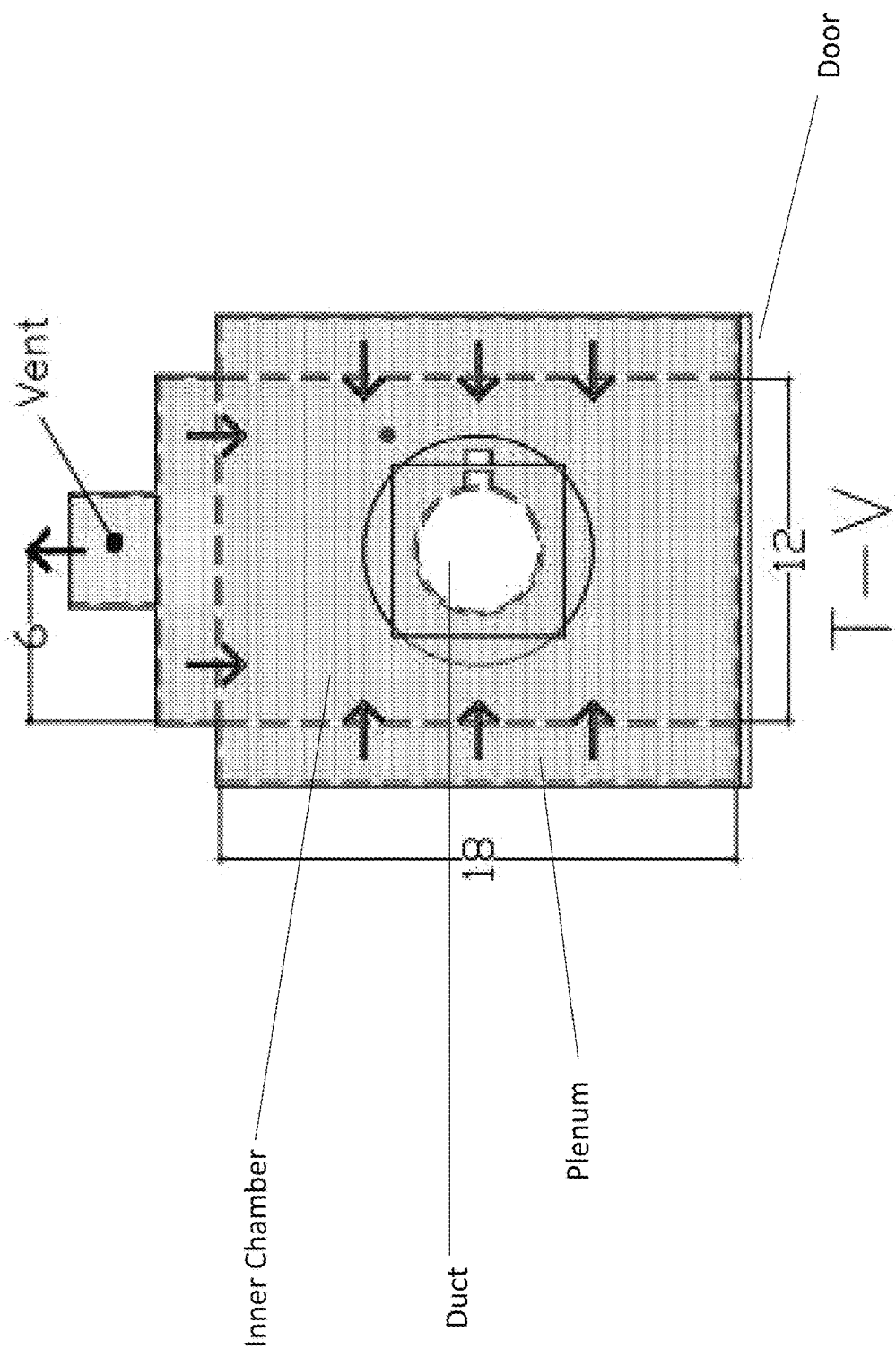
FIG. 1 illustrates an embodiment of the device from a top view.

The inner chamber of the HHW may have a top side, a left side, a right side, and a back side. The sides of the inner chamber are connected to the plenums via a pre-determined number of opening of pre-determined size. In one embodiment, the openings may be a plurality of narrow slit openings. FIGS. 1 and 2 illustrate a location of the plurality of plenums surrounding the sides of the inner chamber of the HHW. The objects may be hung from the top side of the inner chamber or placed in the inner chamber. The inner chamber may be sealed via a tightly held door on a front of the HHW. FIGS. 1 and 2 illustrate an embodiment of the door from a top view, a front view, and a side view. In one non-limiting embodiment, the door may be made of glass.

FIGS. 1 and 2 illustrate a flow and a direction of the compressed gas via arrows. The compressed gas may flow from the pre-heating device to the duct, then to a plurality of plenums surrounding the inner chamber, and then to the inner chamber via a pre-determined number of opening of a pre-determined size. The compressed gas may be used to carry the heat and the gaseous components of the vaporization of the hydrogen peroxide or the water. The plurality of plenums surrounding the inner chamber are communicatively connected with each other and communicatively connect with the batch oven via a pre-determined number of openings of a pre-determined size. The size of the openings can be correlated with the flow and the pressure of the compressed gas into inner chamber, removing the need for any moving parts.

In one non-limiting embodiment, the plurality of narrow slits allows the compressed pre-heated air, with other gaseous components, to enter the inner chamber from different directions at a high velocity. The high velocity of the compressed gas flowing through the openings may create a turbulent or windy atmosphere surrounding the objects placed within the inner chamber. The turbulent or windy atmosphere of the inner chamber may be of a uniformly controlled composition and a temperature. The turbulent or windy atmosphere ensures that all the surfaces and the materials of the object to be decontaminated, sterilized, or disinfected are equally and efficiently exposed to the compressed gas at the same time. The compressed gas may be a carrier for the other gaseous components to kill harmful microorganisms effectively and quickly at the same time.

In one non-limiting embodiment, the HHW may not include moving parts, such as a fan or any other atmosphere circulation device. The turbulent or windy atmosphere may be created via a tailor-made design, a number of the narrow slits, a location of the narrow slits, a dimension of each of the narrow slits, and a pressure and a flow rate of the compressed gas pre-heated to a pre-determined temperature. A velocity of the compressed gas entering the inner chamber can be generated up to 60 feet per seconds (see Table A). Depending upon a type of material of the object, the required velocities for decontamination, sterilization, or disinfection will be well under 30 feet per second.

Some non-limiting embodiments described herein may be designed to deliver the compressed gas to the inner chamber in a controlled, monitorable, and optionally electronically displayable manner with the following properties:

Temperature: Up to 700° F.

Air Flow: up to 60 Cubic Feet per minute

Air Composition: Dew Point up to +120° F. and Hydrogen Peroxide vapor concentration in air between 0 and 2,000 ppm.

Air Velocity (calculated—see Table A) at the exit end point of all slits of the interior chamber of the Oven: up to 60 feet per second.

Time at temperature: As needed to kill the harmful organisms practically 100% without adversely affecting the performance of the PPE and instruments for re-use multiple times.

TABLE A

Calculated Air Velocity as air enters the Oven Chamber (Feet/sec)

| slit size (in × in) | Slit area (Sq. Inch) | Total # of Slits | Air Flow Standard Cubic Feet per minute (SCF/min) | | | | |
|---|---|---|---|---|---|---|---|
| | | | 1 | 5 | 10 | 15 | 20 |
| | | | Air Velocity at Entry point in Oven Chamber (Feet/sec) | | | | |
| 1 × 0.08 | 0.08 | 60 | 0.48 | 2.4 | 4.8 | 7.2 | 9.6 |
| 1 × 0.04 | 0.04 | 60 | 0.96 | 4.8 | 9.6 | 14.4 | 19.2 |
| 1 × 0.08 | 0.08 | 30 | 0.96 | 4.8 | 9.6 | 14.4 | 19.2 |
| 1 × 0.04 | 0.04 | 30 | 1.92 | 9.6 | 19.2 | 28.8 | 38.2 |
| 1 × 0.08 | 0.08 | 20 | 1.44 | 7.2 | 14.4 | 21.6 | 28.8 |
| 1 × 0.04 | 0.04 | 20 | 2.88 | 14.4 | 28.8 | 43.2 | 57.6 |

| Multiplying Factor as a function of Temperature in the Oven Chamber | | | | | | | |
|---|---|---|---|---|---|---|---|
| 70 F. | 100 F. | 150 F. | 200 F. | 300 F. | 400 F. | 500 F. | 600 F. |
| Factor ---> 1 | 1.057 | 1.151 | 1.246 | 1.435 | 1.624 | 1.813 | 2.002 |

The above values are for air at Room Temperature

Example: Say 10 SCF/minute of Air is heated to 300 F. It now enters the Oven through 30 slits.
Each slit is 1"×0.08"; Air velocity at the entry point in the chamber is 9.6×1.435=13.776 feet/sec

TABLE B

Examples of Materials that can be Decontaminated or disinfected or sterilized:

| | Low Heat Resistant Materials like N95 | Medium Heat Resistant Materials like Syringes* | High Heat Resistant Materials like Surgical Instruments** |
|---|---|---|---|
| Temperature (F.) | 100-250 | 150-350 | 200-700 |
| Air Flow (CF/M) | 5-30 | 3-10 | 2-7 |
| Start Wind Velocity (F/s) | 5-30 | 3-10 | 2-7 |
| Power (kWh) | <2 | <2 | <2 |
| Water (Gal/hr)*** | 0.04-1.0 | 0.02-0.5 | 0.02-0.3 |
| $H_2O_2$ (10%; Gal/hr)**** | 0.03-0.2 | Up to 0.05 | Up to 0.05 |

*Higher Temperature Plastics
**Metals like Stainless Steels
***Air needs to be "Moist" for any reason like better heat transfer within N95 like materials
****Hot Windy air could have $H_2O_2$ Vapor concentration of up to about 2,000 ppm in case there is definite need to reduce the air temperature further to have acceptable efficacy for N95 like PPE materials.

In a first non-limiting embodiment, the following process may be used. A set of twelve used N95 masks may be hung on two racks by an operator near the top of the inner chamber of the HHW, ensuring that there is a space between the masks. The door to the inner chamber may be closed until it is airtight. The compressed gas may be a flow rate of 10 SCFM of filtered clean air at a room temperature and a pressure of 20 PSI. The air may be passed through a column of water at about 90° F. in the air bubbler ([0018]; [0019]) to give the compressed air a dew point of about 80° F. The humidified air may then be passed through the air heater ([0018]; [0020]; FIGS. 1 and 2) to heat the air to a temperature of 210-220° F. The externally pre-heated humid air is then flows into the top plenum, as depicted by the arrows in FIG. 2, which is interconnected with two other plenums (left side and right side). The 10 SCFM of air may be divided into three equal volumes (3.33 SCFM) among each of the three plenums. The three plenums are thermally insulated to keep the external temperature of a surface of the device below 100° F. There may be a stainless-steel wall between each plenum. The inner chamber of the HHW may have 10 slits of identical dimensions. Each of the slits may be 1" long×0.08" wide. The 3.33 SCFH of the humidified, hot, and compressed air, at a temperature of about 200° F., may then flow to the inner chamber of the HHW through the 10 identical slits of each of the three plenums. A net velocity of the 200° F. humidified air as it exits each of the 30 slits of the plenums into the inner chamber may be about 11.962 feet per second (see Table A: Calculated Air Velocity). The high velocity humidified, hot, and compressed air may enter the inner chamber of the HHW from three different directions (top, left and right; see FIG. 2 arrows). The three directions may create a windy and a turbulent air flow within the inner chamber, which ensures that all sides of the N95 masks are fully exposed to the humidified, hot, compressed, and windy-turbulent air. Exposure of the N95 masks to the hot humid windy turbulent air may efficiently, and effectively, decontaminate, and disinfect the N95 masks to be used again without losing its efficacy. The non-limiting process described herein may occur over one hour, during which, the N95 masks are exposed to the humidified, hot, compressed, and windy-turbulent air at a temperature of about 200° F. The humidified, hot, compressed, and windy-turbulent air, after being used in the inner chamber, may be exhausted through a plurality of slits or openings on a floor of the HHW connected to an independent plenum, where the air may be vented safely. After the one hour cycle is over, the operator may then turn off the air heater. The operator may then bypass the compressed air around the water column via a bypass valve in the air bubbler. The operator may then turn off the compressed air flow, after which, the door may be opened and the N95 masks may be removed from the inner chamber to be reused.

In an embodiment building upon the process of the first embodiment wherein, the compressed air may be heated, in a pre-heating device or air heater, to a pre-determined temperature very quickly by passing the air through a plurality of parallel long channels. Each of the parallel long channels may include an electrically heated metallic element. As the air passes through the channels, a plurality of heated air streams may be created. The air streams may be combined in a plenum to create one heated air stream before entering the plenums surrounding the HHW.

In an embodiment building upon the process of the first embodiment wherein a 10% H2O2 solution is dripped onto a dish within the duct, placed between the exit of the air heater and the top plenum of the HHW. The H2O2 may be vaporized, via the heated, compressed air, to give the humidified, hot, compressed air inside the duct an H2O2 concentration of about 100 ppm of H2O2. The concentration of H2O2 may further increase the efficacy of decontamination, disinfection, and sterilization.

In an embodiment building upon the process of the first embodiment wherein ten used syringes may be placed inside the inner chamber. In this embodiment, the process may use a flow rate of 5 SCFM of a filtered compressed air, and the filtered compressed air may be humidified to a dew point of 70° F. The humidified, compressed air may be heated to a higher temperature of about 300° F. A calculated velocity of the humidified, hot, compressed air exiting the slits of the plenums to the inner chamber may be about 6.888 feet per second.

In an embodiment building upon the process of the first embodiment wherein a plurality of used stainless steel medical instruments may be placed within the inner chamber. In this embodiment, the flow rate of the compressed air may be 3 SCFM and the compressed air may be humidified to a normal dew point of the air in the room. The humidified, compressed air may be called "dry air." The dry air may be heated to a temperature of 500° F. in the air heater. The 3 SCFM flow rate of the heated, dry air may then flow into the three plenums (1 SCFM per plenum) via the 30 slits. A calculated velocity of the heated, dry air as it flows into the inner chamber via the 30 slits may be about 5.221 feet per second.

In an embodiment building upon the process of the first embodiment wherein the water may be dripped through an injection point of the duct into a dish placed between the exit of the air heater and the top plenum of the HHW. The water may be vaporized, via the heated, compressed air, to give the heated, compressed air a dew point of the air inside to about 80° F.

In an embodiment building upon the process of the first embodiment wherein the device may have four interconnected plenums to receive the heated, compressed air. The four plenums may be located on a top side, a left side, a back side, and a right side of the HHW. An independent plenum located on the bottom of the HHW may be used to vent out the air to complete the process.

In an embodiment building upon the process of the first embodiment wherein a pre-determined setting for an embodiment of a decontamination, a disinfection, or a sterilization cycle may be recorded and managed electronically for better record keeping of each cycle.

In an embodiment building upon the process of the first embodiment wherein the process may be started and ended by dialing in a recipe number for a material. A Machine-Human-Interface electronic hardware may be attached to the device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device comprising:
   a batch oven comprising an inner chamber wherein said inner chamber is surrounded by a plurality of plenums wherein said plenums are communicatively connected to said inner chamber via a plurality of narrow openings which have a cross sectional area of at least 0.04 sq. inch and up to 0.08 sq. inch;
   a gas delivery system comprising a source of a compressed gas;
   a water introduction system for humidifying said compressed gas to a dew point of up to 120° F.;
   a pre-heating device comprising an input for said compressed gas wherein said pre-heating device heats said compressed gas up to a temperature of 700° F.; and
   a duct, wherein a first end of the duct is connected to said pre-heating device and a second end of the duct is connected to said batch oven, such that said compressed gas flows from said pre-heating device to said batch oven and through said plurality of narrow openings at an exit velocity up to 60 Fps.

2. The device of claim 1, wherein said batch oven further comprises, thermal insulation, and a door.

3. The device of claim 1, wherein said device further comprises, an air bubbler for said gas delivery system to humidify said compressed gas.

4. The device of claim 1, wherein said duct further comprises, an input such that a liquid can be introduced externally from said device.

5. The device of claim 4, wherein said duct further comprises an internal dish, wherein said dish holds said liquid.

6. The device of claim 1, wherein said pre-heating device further comprises a plurality of parallel channels, wherein each parallel channel includes a heating element.

7. The device of claim 1, wherein said device further comprises, a monitoring system that records a flow of said compressed gas, a temperature of said compressed gas, a dewpoint of said compressed gas, a hydrogen peroxide concentration of said compressed gas, and a timer to record the time duration of the operation of the system.

8. The device of claim 1, further comprising the temperature within said inner chamber is between 100-250° F., the flow rate of said compressed gas is between 5-30 CFM, and a wind velocity of said compressed gas is between 5-30 Fps.

9. The device of claim 1, further comprising the temperature within said inner chamber is between 150-350° F., the flow rate of said compressed gas is between 3-10 CFM, and a wind velocity of said compressed gas is between 3-10 Fps.

10. The device of claim 1, further comprising the temperature within said inner chamber is between 200-700° F., the flow rate of the said compressed gas is between 2-7 CFM, and a wind velocity of said compressed gas is between 2-7 Fps.

11. The device of claim 1, wherein said duct further comprises an input such that a liquid can be introduced externally from said device wherein said liquid comprises a water flow between 0.04-1.0 Gal/hr, and $H_2O_2$ between 0.03-0.2 Gal/hr.

12. The device of claim 1, wherein said duct further comprises an input such that a liquid can be introduced externally from said device wherein said liquid comprises a water flow between 0.02-0.5 Gal/hr, and $H_2O_2$ up to 0.05 Gal/hr.

13. The device of claim 1, wherein said duct further comprises an input such that a liquid can be introduced externally from said device wherein said liquid comprises a water flow between 0.02-0.3 Gal/hr, and $H_2O_2$ up to 0.05 Gal/hr.

14. The device of claim 1 further comprising said plurality of narrow openings comprise one of 20 openings, 30 openings, and 60 openings.

15. The device of claim 1, wherein said water introduction system is located between said gas delivery system and said pre-heating device.

16. The device of claim 1, wherein said water introduction system introduces water between said gas delivery system and said pre-heating device to bring said dew point of said compressed gas up to 60 F and introduces water to said pre-heating device to raise said dew point of said compressed gas up to 120 F.

17. The device of claim 1, wherein said water introduction system introduces water to said pre-heating device.

18. The device of claim 1, wherein said water introduction system introduces $H_2O_2$.

* * * * *